(12) United States Patent
Yoon et al.

(10) Patent No.: US 7,887,951 B2
(45) Date of Patent: Feb. 15, 2011

(54) RECHARGEABLE BATTERY

(75) Inventors: Ji-Hyoung Yoon, Suwon-si (KR);
Tatsuya Hashimoto, Suwon-si (KR);
Yong-Sam Kim, Suwon-si (KR);
Seok-Yoon Yoo, Suwon-si (KR);
Chi-Young Lee, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 407 days.

(21) Appl. No.: 12/010,555

(22) Filed: Jan. 25, 2008

(65) Prior Publication Data

US 2009/0087735 A1    Apr. 2, 2009

(30) Foreign Application Priority Data

Sep. 27, 2007  (KR) .................. 10-2007-0097307

(51) Int. Cl.
*H01M 2/08* (2006.01)

(52) U.S. Cl. .......................................... 429/185

(58) Field of Classification Search .................. 429/65, 429/211, 143, 144, 146
See application file for complete search history.

(56) References Cited

U.S. PATENT DOCUMENTS

| | | | |
|---|---|---|---|
| 1,932,136 A | | 10/1933 | Hole |
| 3,732,124 A | * | 5/1973 | Cailley .................. 429/94 |
| 4,495,259 A | | 1/1985 | Uba |
| 4,554,227 A | * | 11/1985 | Takagaki et al. ............ 429/178 |
| 5,158,842 A | * | 10/1992 | McHenry .................. 429/161 |
| 2003/0049536 A1 | | 3/2003 | Wiepen |
| 2003/0215706 A1 | | 11/2003 | Alunans et al. |

FOREIGN PATENT DOCUMENTS

| | | |
|---|---|---|
| EP | 0545906 A | 6/1993 |
| KR | 10-2005-0103645 | 11/2005 |
| KR | 10-2005-0121907 A | 12/2005 |
| KR | 10-2005-0123484 A | 12/2005 |

OTHER PUBLICATIONS

European Search Report dated Jan. 23, 2009 in Applicant's corresponding European Application No. 08157726.4.

* cited by examiner

*Primary Examiner*—Melvin C Mayes
*Assistant Examiner*—Michael Forrest
(74) *Attorney, Agent, or Firm*—Robert E. Bushnell, Esq.

(57) ABSTRACT

A rechargeable battery having a current collector plates that a have a stable and reliable connection to an uncoated portion of one of the anode and the cathode of the electrode assembly. The rechargeable battery includes the electrode assembly, a case, a cap assembly, and the current collecting plates. The electrode assembly includes the anode, the cathode, and a separator arranged between the anode and the cathode. The case houses the electrode assembly. The cap assembly closes and seals the case and includes an electrode terminal. The current collecting plates connect the electrode assembly and the cap assembly and each include a plurality of current collecting protrusions that extend into the electrode assembly. The current collecting protrusions of one current collector plate are arranged among the current collecting protrusions of another current collecting plate, and the uncoated region of one of the anode and the cathode is arranged among these current collecting protrusions.

10 Claims, 5 Drawing Sheets

RECHARGEABLE BATTERY

CLAIM OF PRIORITY

This application makes reference to, incorporates the same herein, and claims all benefits accruing under 35 U.S.C. §119 from an application earlier filed in the Korean Intellectual Property Office on 27 Sep. 2007 and there duly assigned Serial No. 10-2007-0097307.

BACKGROUND OF THE INVENTION

1. Field of the Invention

The present invention relates to a rechargeable battery having an improved structure of a current collecting plate electrically connected to an electrode assembly.

2. Description of the Related Art

Rechargeable batteries can be repeatedly charged and discharged, unlike a primary battery that is incapable of being recharged. A low capacity rechargeable battery composed of a single cell is generally used for a portable small electronic device, such as a mobile phone, a laptop computer, and a camcorder. A large capacity rechargeable battery composed of a plurality of cells connected in a form of a pack is widely used to drive a motor for a hybrid electric vehicle. Such rechargeable batteries are serially connected to form a rechargeable battery module to drive a motor for an electric vehicle, which needs a large amount of electric power.

Such a rechargeable battery is manufactured in various forms. The representative form of a rechargeable battery is a cylindrical form or a quadrilateral form. The rechargeable battery includes an electrode assembly having an anode and a cathode with a separator interposed therebetween, a case for providing a space for housing the electrode assembly, and a cap assembly for closing and sealing the case.

In the case of a rechargeable battery formed in a cylindrical shape, an uncoated region, where an active material is not coated, are formed in the anode and the cathode of the electrode assembly, and a positive uncoated region and a negative uncoated region are disposed to face in different directions.

A cathode current collecting plate is adhered on the negative uncoated region and an anode current collecting plate is adhered on the positive uncoated region. The cathode current collecting plate is electrically connected to the case, and the anode current collecting plate is electrically connected to the cap assembly to allow current to pass to the outside. Therefore, the case is operated as a negative terminal, and the cap plate mounted in the cap assembly is operated as a positive terminal.

Since the anode current collecting plate and the cap assembly are electrically connected by a lead member made of a conductive metal, the lead member, the anode current collecting plate, and the cap assembly are welded together and then inserted into the case. After the cap assembly is inserted, the cap assembly is fixed to the case by clamping the cap assembly.

Since current is drawn out to the outside through the current collecting plate that is electrically connected to the electrode assembly, it is very important to have a stable connection between current collecting plate and the electrode assembly.

In the case of a high power battery, high current flows through the current collecting plate. Therefore, the smaller the resistivity of the current collecting plate, the more current loss can be reduced. Accordingly, it is preferable to form the current collecting plate to have a large thickness. However, if the thickness of the current collecting plate is too thick, heat is not fully transferred to the electrode assembly and so it is difficult to weld the current collecting plate to the electrode assembly.

Conventionally, the current collecting plate and the electrode assembly are simply welded together at a surface contact of the current collecting plate and the electrode assembly. Since no structure supports the current collecting plate in a side direction, the contact between the electrode assembly and the current collecting plate becomes poor weak an external impact is applied. If the contact between the current collecting plate and the electrode assembly becomes poor, the resistivity around the contact increases. Therefore, the output of the rechargeable battery becomes reduced and the rechargeable battery generates a large amount of heat. What is therefore needed is an improved design for a rechargeable batter where the contact between the electrode assembly and the current collecting plate that is strong and reliable enough to withstand various forms of impact.

SUMMARY OF THE INVENTION

The present invention has been made in an effort to provide a rechargeable battery having the advantage of having a current collecting plate that has a strong, stable and reliable electrical connection to an electrode assembly.

It is a technical subject of the present invention to provide a rechargeable battery having a current collecting plate that has a stable and reliable connection to an electrode assembly.

It is another technical subject of the present invention to provide a rechargeable battery for providing an enhanced output by reducing the resistivity of a current collecting plate.

An exemplary embodiment of the present invention provides a rechargeable battery. The rechargeable battery includes an electrode assembly, a case, a cap assembly, and a current collecting plate, the electrode assembly includes an anode, a cathode, and a separator arranged between the anode and the cathode, the anode, the cathode and the separator arranged as a plurality of windings, each of the anode and the cathode having a coated region and an uncoated region, a case adapted to house the electrode assembly, a cap assembly including an electrode terminal, the cap assembly adapted to close and seal the case and a plurality of current collecting plates adapted to electrically connect the electrode assembly to the cap assembly, each of the plurality of current collecting plates includes a plurality of current collecting protrusions extending into the electrode assembly, wherein the plurality of current collecting protrusions of one of the plurality of current collecting plates are arranged among a plurality of current collecting protrusions of another of said plurality of current collecting plates, and wherein ones of the plurality of windings of the uncoated region of one of the anode and the cathode are arranged among the plurality of current collecting protrusions of the one and the another of the plurality of current collecting plates.

Each of the plurality of current collecting plates can further include a flat part, each of the plurality of current collecting protrusions can protrude from the flat part. Each of the plurality of current collecting protrusions can include an inclined protrusion part that adapted to protrude from and the flat part and an incline and from the flat part and towards the electrode assembly, an extended protrusion part adapted to protrude from the inclined protrusion part, the extended protrusion part being in parallel with the flat part and an inserting protrusion part that adapted to protrude from the extended protrusion part and towards one of said plurality of windings of the uncoated region of one of the anode and the cathode. The inserting protrusion part can have one end arranged as a wedge shape. Adjacent ones of the plurality of current collecting protrusions can be arranged to have the extended protrusion parts located in a same plane. Each of the plurality of current collecting plates can be fixed to ones of the plurality of windings of the uncoated region of one of the anode and the cathode via a weld, ones of the plurality of windings of the uncoated region of the one of the anode and the cathode can be arranged among ones of the plurality of current collecting protrusions of both the one and the another of the plurality of current collecting plates. Ones of the plurality of windings of the uncoated region of the one of the anode and the cathode can be fixed to the extended protrusion parts of ones of the plurality of current collecting protrusions of both the one and the another of the plurality of current collector plates via a weld. The plurality of current collecting plates can consist of only two current collecting plates.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
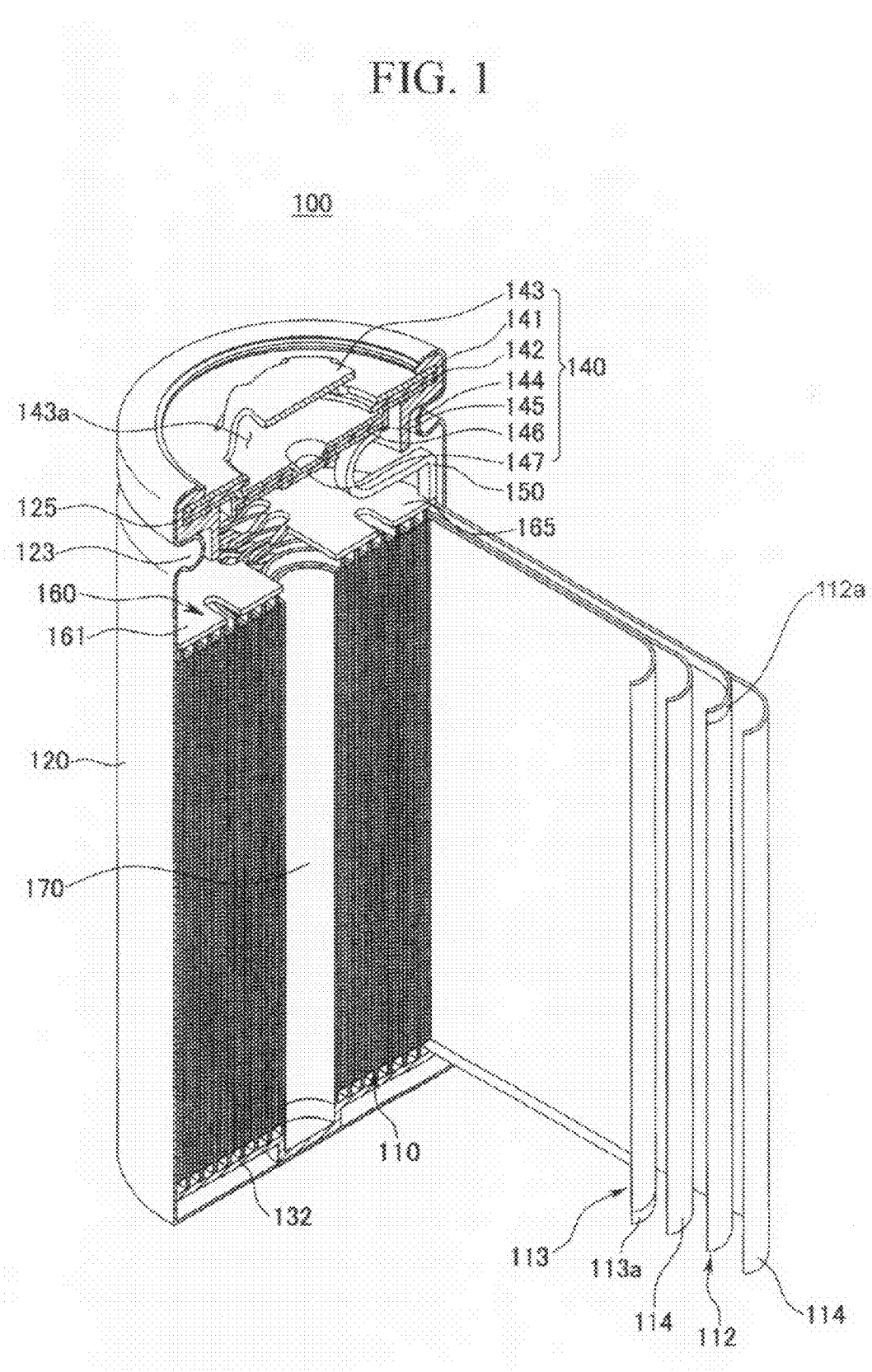
FIG. 1 is a cross-sectional perspective view of a rechargeable battery according to an exemplary embodiment of the present invention.

FIG. 1 is a cross-sectional perspective view of a rechargeable battery according to an exemplary embodiment of the present invention. Referring to FIG. 1, the rechargeable battery 100 according to the present invention includes an electrode assembly 110 having an anode 112 and a cathode 113 with a separator 114 interposed between the anode 112 and the cathode 113, and a case 120 having an opening formed at the top end to house the electrode assembly 110 and an electrolyte solution. A cap assembly 140 is disposed at the opening of the case 120 by using a gasket 144.

The case 120 is made out of a conductive metal such as steel coated with aluminum, an aluminum alloy, or nickel. The case 120, according to the present exemplary embodiment, is formed in a cylindrical shape and has an internal space to house the electrode assembly 110. After inserting the cap assembly 140 into the case 120, the cap assembly 140 is fixed to the case 120 through clamping. In the clamping process, a beading part 123 and a clamping part 125 are formed.

The electrode assembly 100, according to the present exemplary embodiment, is formed in a cylindrical shape. That is, the anode 112, the separator 114, and the cathode 113 are sequentially wound into a plurality of windings to form the electrode assembly 110 in a cylindrical shape. However, the structure of the electrode assembly 110 is not limited thereto, and can be formed in other various structures. A space is formed in the center of the electrode assembly 110, and a center pin 170 is disposed in the space for enabling the electrode assembly 110 to sustain the cylindrical shape.

Referring to FIG. 1, a positive uncoated region 112a is formed at an upper end of the anode 112. This uncoated region 112a is not coated with a positive active material. The anode 112 is electrically connected to an anode current collecting plate 160 at the positive uncoated region 112a. Referring to FIG. 1, a negative uncoated region 113a is formed at the lower end of the cathode 113. This negative uncoated region 113a is not coated with a negative active material. The cathode 113 is electrically connected to a cathode current collecting plate 132 at the negative uncoated region 113a.

The cap assembly 140 includes a cap plate 143 having a protruded outer terminal and an exhaust port 143a, and a vent plate 142 disposed under the cap plate 143 for discharging gas by being broken when a predetermined pressure condition is satisfied. The vent plate 142 interrupts the electrical connection between the electrode assembly 110 and the cap plate 143 when the predetermined pressure condition occurs.

Since a positive temperature coefficient element 141 is disposed between the cap plate 143 and the vent plate 142, the positive temperature coefficient element 141 unlimitedly increases in electrical resistance when the temperature rises above a predetermined temperature. When the rechargeable battery 100 reaches a temperature higher than a predetermined value, the positive temperature coefficient element 141 interrupts the flow of current for charging and discharging.

The vent plate 142 is protruded downwardly and includes a sub plate 147 attached at the bottom side of the protruded part. A middle plate 146 is disposed at the edge of the vent plate 142, is fixed at the sub plate 147, and electrically connects to the electrode assembly 110 through a lead unit 150. An insulator 145 is disposed between the middle plate 146 and the vent plate 142 to insulate the middle plate 146 from the vent plate 142.

The anode current collecting plate 160 is made out of two current collecting plates 161 and 165 engaged together with each other. In the present exemplary embodiment, the anode current collecting plate is exemplary described. However, the present invention is not limited thereto, and the cathode current collecting plate can have the same structure as the anode current collecting plate according to the present exemplary embodiment.

Figure 2:
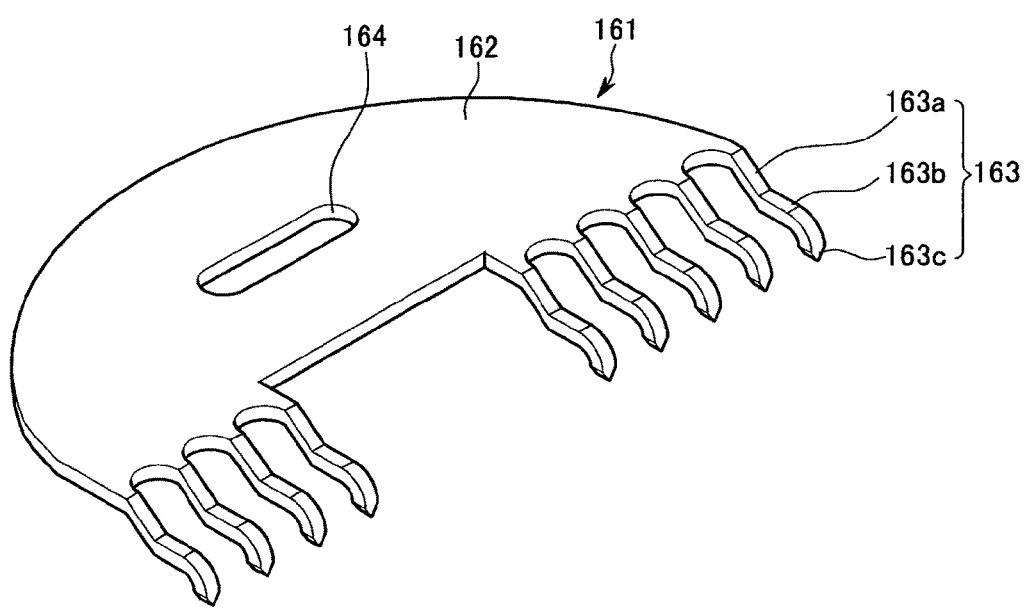
FIG. 2 is a perspective view of a current collecting plate according to an exemplary embodiment of the present invention.

Referring to FIG. 2, the current collecting plate 161 will be described in detail. Since the two current collecting plates 161 and 165 facing each other have the same structure, only the current collecting plate 161 will be described and the description of the current collecting plate 165 will be omitted.

The current collecting plate 161 includes a flat part 162 and a plurality of current collecting protrusions 163 protruded from the flat part 162. The current collecting protrusions 163 are formed at one side of the flat part 162. The current collecting protrusions 163 are protruded from the side of the flat part 162 in a front direction and are separated at a predetermined distance from each other. Each of the current collecting protrusions 163 includes an inclined protrusion part 163a protruded from the flat part 162 and inclined downwardly, an extended protrusion part 163b continuously formed from the inclined protrusion part 163a and protruded in parallel with the flat part 162, and an inserting protrusion part 163c vertically continued from the extended protrusion part 163b.

The inserting protrusion part 163c has a pointed end allowing it to be easily inserted between the windings of positive uncoated region 112a. The flat part 162 is formed in the shape of a flat semicircular board and includes a ventilation hole 164.

Figure 3:
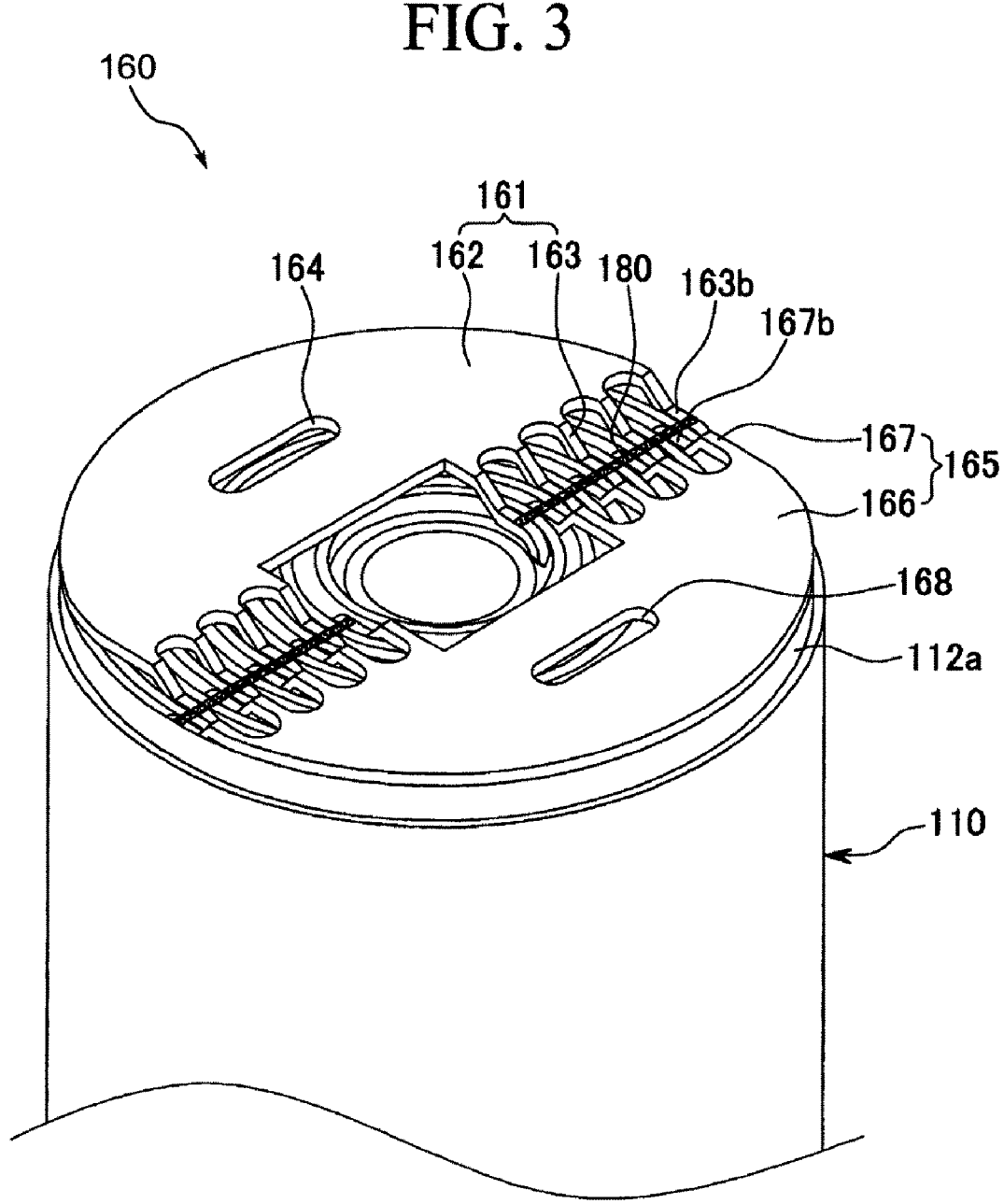
FIG. 3 is a partial perspective view of an electrode assembly attached to a current collecting plate according to an exemplary embodiment of the present invention.

As shown in FIG. 3, the two current collecting plates 161 and 165 include flat parts 162 and 166 and a plurality of current collecting protrusions 163 and 167. The flat parts 162 and 166 include ventilation holes 164 and 168. The current collecting protrusions 163 and 167 protruded from the flat parts 162 and 166 are arranged to be crossed with each other, thereby making contact with the windings of the positive uncoated region 112a.

FIG. 3 exemplary illustrates the anode current collecting plate 160 disposed at the positive uncoated region 112a. However, the present invention is not limited to the anode current collecting plate 160, and the cathode current collecting plate can instead or also have the same structure.

Figure 4:
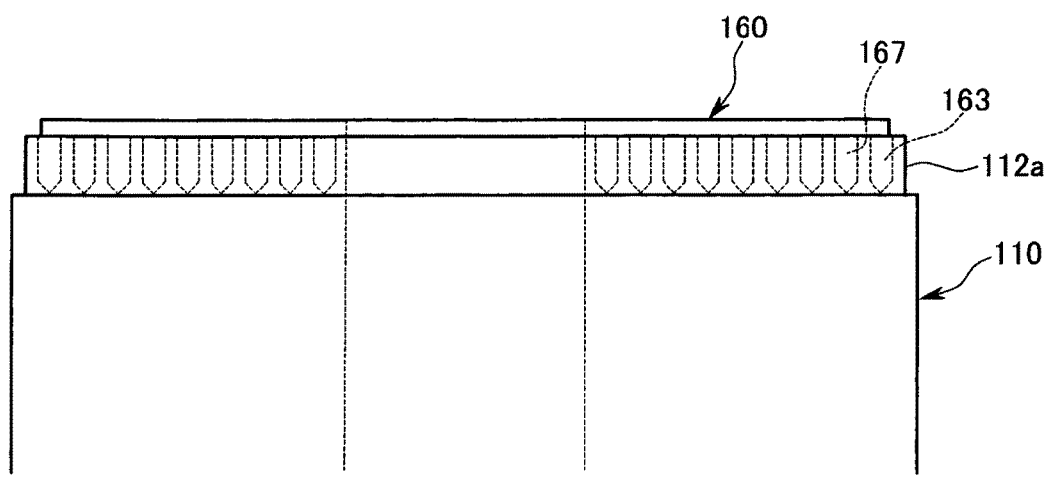
FIG. 4 is a front view of the electrode assembly attached to the current collecting plate of, FIG. 3.
Figure 5:
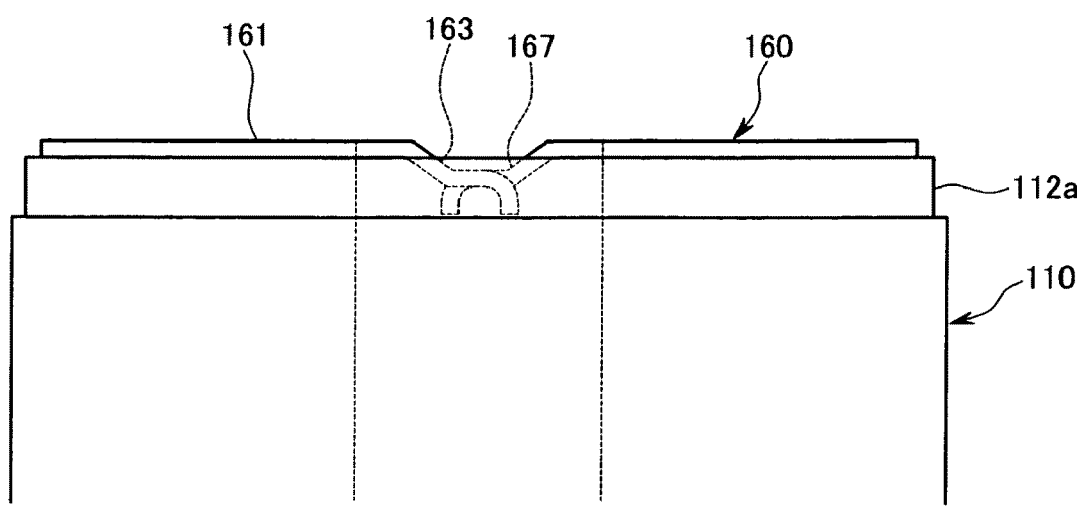
FIG. 5 is a side view of the electrode assembly attached to the current collecting plate of FIG. 3.

As shown in FIGS. 4 and 5, the current collecting plates 161 and 165 are disposed on the positive uncoated region 112a, and the plurality of current collecting protrusions 163 and 167 extend into the windings of the positive uncoated region 112a. The current collecting protrusions 163 and 167 are inserted mutually while the two current collecting plates 161 and 165 face each other. Accordingly, the extended protrusion parts 163b and 167b of the current collecting protrusions 163 and 167 are arranged in parallel in the same plane by being overlapped with each other.

Referring to FIG. 3, a process of installing the current collecting plate 160 on the electrode assembly 110 will be described, hereinafter. At first, one current collecting plate 161 is disposed on the windings of the positive uncoated region 112a. When the current collecting plate 161 is disposed on the windings of the positive uncoated region 112a, current collecting protrusions 163 penetrate into the windings of the positive uncoated regions 112a. Since the inserting protrusion part 163c of each current collecting protrusion 163 has one end formed in a wedge shape, the current collection protrusion 163 can easily penetrate into the windings of the positive uncoated region 112a.

After one current collecting plate 161 is placed on the windings of the positive uncoated region 112a, another current collecting plate 165 is disposed on the windings of the positive uncoated region 112a to form a pair with the current collecting plate 161. The current collecting protrusions 167 of the other current collecting plate 165 are disposed to cross the current collecting protrusions 163 of the previously disposed current collecting plate 161. While the current collecting protrusions 167 of the current collecting plate 165 are penetrating into the windings of the positive uncoated region 112a, the windings of the positive uncoated region 112a extend between the current collecting protrusions 163 and 167 and protruded.

As the current collecting protrusions 163 and 167 are inserted between the windings of the positive uncoated region 112a, the current collecting plate 160 is intertwined with the windings of the positive uncoated region 112a. Therefore, the anode current collecting plate 160 is stably prevented from moving away from the electrode assembly 110.

The current collecting protrusions 163 and 167 are welded together with the windings of the positive uncoated region 112a that extends between the current collecting protrusions 163 and 167 to form a welding line 180 on the current collecting plate 160. The current collecting plate 160 and the windings of the positive uncoated region 112a are disposed in the same plane as the welding line 180. The welding is performed between the extensions 163b and 167b and the windings of the positive uncoated region 112a arranged in the same plane in parallel.

If the windings of the positive uncoated region 112a and the anode current collecting plate 160 are disposed in the same plane, as in the present exemplary embodiment, the current collecting plate 160 can be stably welded to the windings of the positive uncoated region 112a, even though the thickness of the current collecting plate 160 is made to be large. Conventionally, a laser is radiated to the current collecting plate, and the heat transferred from the current collecting plate is used to weld the windings of the uncoated region. Therefore, if the current collecting plate is made too thick, the heat is not properly transferred from the current collecting plate to the windings of the uncoated region. If the windings of the positive uncoated region 112a are protruded between the current collecting protrusions 163 and 167, as in the present exemplary embodiment, the laser can be directly radiated onto the windings of the positive uncoated region 112a to melt the windings of the positive uncoated region 112a. Therefore, the current collecting plate 160 can be stably welded even though the current collecting plate 160 is thick.

Since the inserted current collecting protrusions 163 and 167 are welded with the windings of the positive uncoated region 112a as a medium, the current collecting protrusions 163 and 167 are integrally fixed at the windings of the positive uncoated region 112a. Therefore, the current collecting plates 161 and 165 are prevented from being moved by an external impact. That is, since the members are not just simply inserted to each other, but are intertwined with each other like a spool of thread, the members are stably fixed together.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As shown above, the current collecting plate is stably fixed at the uncoated regions by inserting the current collecting protrusions of the current collecting plate into the uncoated regions according to an embodiment of the present invention. Therefore, contact resistivity can be minimized according to an embodiment of the present invention.

Since the current collecting plate and the windings of the uncoated region are welded in the same plane, the thickness of the current collecting plate can be made to be thick while providing for a strong, stable and reliable electrical connection between the current collecting plate and the electrode assembly. Therefore, the output of the rechargeable battery becomes improved because the resistivity of the current collecting plate is reduced.

What is claimed is:

1. A rechargeable battery, comprising:
an electrode assembly including an anode, a cathode, and a separator arranged between the anode and the cathode, the anode, the cathode and the separator arranged as a plurality of windings, each of the anode and the cathode having a coated region and an uncoated region;
a case adapted to house the electrode assembly;
a cap assembly including an electrode terminal, the cap assembly adapted to close and seal the case; and
a plurality of current collecting plates adapted to electrically connect the electrode assembly to the cap assembly, each of the plurality of current collecting plates includes a plurality of current collecting protrusions extending into the electrode assembly;
the plurality of current collecting protrusions of one of the plurality of current collecting plates are crossed with the plurality of current collecting protrusions of another of the plurality of current collecting plates, and the plurality of windings of the uncoated region of one of the anode and the cathode are intertwined with the plurality of current collecting protrusions of the plurality of current collecting plates.

2. The rechargeable battery of claim 1, wherein each of the plurality of current collecting plates further includes a flat part, each of the plurality of current collecting protrusions protruding from the flat part.

3. The rechargeable battery of claim 2, wherein each of the plurality of current collecting protrusions comprises:
   an inclined protrusion part that adapted to protrude from and the flat part and an incline and from the flat part and towards the electrode assembly;
   an extended protrusion part adapted to protrude from the inclined protrusion part, the extended protrusion part being in parallel with the flat part; and
   an inserting protrusion part that adapted to protrude from the extended protrusion part and towards one of said plurality of windings of the uncoated region of one of the anode and the cathode.

4. The rechargeable battery of claim 3, wherein the inserting protrusion part has one end arranged as a wedge shape.

5. The rechargeable battery of claim 3, wherein adjacent current collecting protrusions are arranged to have the extended protrusion parts located in a same plane.

6. The rechargeable battery of claim 1, wherein each of the plurality of current collecting plates is fixed to plurality of windings of the uncoated region of one of the anode and the cathode via a weld, the plurality of windings of the uncoated region of the one of the anode and the cathode being intertwined with the plurality of current collecting protrusions of the plurality of current collecting plates.

7. The rechargeable battery of claim 3, wherein the plurality of windings of the uncoated region of the one of the anode and the cathode are fixed to the extended protrusion parts of the plurality of current collecting protrusions of the plurality of current collecting plates via a weld.

8. The rechargeable battery of claim 1, wherein the plurality of current collecting plates comprises only two current collecting plates.

9. A rechargeable battery, comprising:
   an electrode assembly including an anode, a cathode, and a separator arranged between the anode and the cathode, the anode, the cathode and the separator arranged as a plurality of windings, each of the anode and the cathode having a coated region and an uncoated region;
   a case adapted to house the electrode assembly;
   a cap assembly including an electrode terminal, the cap assembly adapted to close and seal the case; and
   a pair of current collecting plates adapted to electrically connect the electrode assembly to the cap assembly, each of the current collecting plates includes a plurality of current collecting protrusions extending into the electrode assembly;
   the plurality of current collecting protrusions of one of the current collecting plates are crossed with the plurality of current collecting protrusions of another of the current collecting plates, and the plurality of windings of the uncoated region of one of the anode and the cathode are intertwined with the plurality of current collecting protrusions of both of the current collecting plates.

10. The rechargeable battery of claim 9, further comprising a weld adapted to join together the plurality of windings of the uncoated region of the one of the anode and the cathode to corresponding current collecting protrusions of the pair of current collecting plates.

* * * * *